United States Patent [19]

Spitz

[11] Patent Number: 4,590,048
[45] Date of Patent: May 20, 1986

[54] REMOVAL OF SULFUR OXIDES FROM GAS STREAMS WITH AMMONIUM SULFITE

[75] Inventor: Albert W. Spitz, Glenside, Pa.

[73] Assignee: Milpat Corporation, Glenside, Pa.

[21] Appl. No.: 678,420

[22] Filed: Dec. 5, 1984

Related U.S. Application Data

[63] Continuation-in-part of Ser. No. 511,533, Jul. 7, 1983, abandoned.

[51] Int. Cl.$^4$ .......................... C01B 17/00; C01C 1/24
[52] U.S. Cl. ...................................... 423/242; 423/545
[58] Field of Search ............... 423/242 A, 242 R, 545; 55/73

[56] References Cited

U.S. PATENT DOCUMENTS

| | | | |
|---|---|---|---|
| 1,931,408 | 10/1933 | Hodsman et al. | 423/242 |
| 2,862,789 | 12/1958 | Burgess | 423/242 |
| 3,503,185 | 3/1970 | Delzenne et al. | 423/242 |
| 3,579,296 | 5/1971 | Cann | 423/242 |
| 3,929,967 | 12/1975 | Cann | 423/242 |
| 3,957,951 | 5/1976 | Hokanson et al. | 42/242 |
| 4,004,966 | 1/1977 | Matty et al. | 423/242 |
| 4,248,842 | 2/1981 | Karpisch et al. | 423/242 |
| 4,250,160 | 2/1981 | Eakman | 423/242 |

OTHER PUBLICATIONS

"Sulfur Oxide Removal from Power Plant Stack Gas" NTIS, 1974.
"Pilot Plant Study of an Ammonia Absorption-Ammonium Bisulfate Regeneration Process, Topical Report Phases I and II", TVA, 1974.
"Pilot Plant Study of an Ammonia Absorption-Ammonium Bisulfate Regenerated Process, Topical Report Phases I and II", NTIS, 1974.

*Primary Examiner*—Gregory A. Heller
*Attorney, Agent, or Firm*—Steele, Gould & Fried

[57] ABSTRACT

A process is disclosed to produce a commercially valuable concentrated nitrogen sulfur solution by scrubbing sulfur dioxide from flue and other gases using ammonium sulfite solution as a scrubbing media. The process also has the capability of removing the sulfur dioxide as an insoluble zinc or calcium salt from the scrubbing solution without having to regenerate, recover and recirculate gaseous ammonia.

8 Claims, 3 Drawing Figures

REMOVAL OF SULFUR OXIDES FROM GAS STREAMS WITH AMMONIUM SULFITE

RELATED APPLICATION

This application is a continuation-in-part of my co-pending application Ser. No. 511,533, filed July 7, 1983, entitled "Removal of Sulfur Oxides from Stack Gas" now, abandoned.

BACKGROUND OF THE INVENTION

1. Field of the Invention

This invention relates to the treatment of gas streams containing sulfur oxides with ammonium sulfite in a manner that minimizes air pollution and produces a useful product while conserving both the ammonia and the sulfur.

2. Discussion of the Prior Art

Sulfur oxides in gaseous effluents are a major source of air pollutants. Such sulfur oxides may be produced by the combination of sulfur-containing fossil fuels or they may result from various processes where sulfur containing compounds are processed. When the sulfur content of the materials being processed is high enough, it is usually recovered either as elemental sulfur or in the form of sulfuric acid.

Many industrial processes and fossil fuel combustion plants, however, produce a gaseous effluent wherein the sulfur dioxide content is a maximum of approximately 2.0% and wherein very small amounts of sulfur trioxide are present. It is with gases of this type that the present invention finds particular utility.

Prior workers in the art have developed numerous types of processes to remove these sulfur oxides. At the present state of development, the most popular process in use employs lime as the active ingredient and produces a throw away calcium sulfitesulfate mixture. Other processes that have been designed with some success employ ammonia and the present invention is concerned with an improvement over such processes. Historically, ammonia scrubbing processes have either processed the scrubber liquid to solids to recover the ammonia and sulfur for fertilizers or other industrial uses, or have decomposed the ammonium salts to liberate the ammonia for reuse and the sulfur dioxide for sulfuric acid production.

The Tennessee Valley Authority has investigated ammonia scrubbing at great length. Their publication "Sulfur Oxide Removal From Power Plant Stack Gas, Ammonia Scrubbing Conceptual Design Cost Study Series", Report APTD-0615, PB 196 804, Sept. 1970 contains both process and cost data on ammonia scrubbing and the production of ammonium sulfate and its use as an intermediate in phosphate fertilizer manufacture. Three processes for treating the scrubber liquid are described. TVA publication "Pilot-plant Study of an Ammonia Absorption-Ammonium Bisulfate Regeneration Process, Topical Report Phases 1 & 2", June 1974, PB-237-170 describes extensively the treatment of scrubber liquor with ammonium bisulfate to produce ammonium sulfate and sulfur dioxide.

SUMMARY OF THE INVENTION

It is an object of the present invention to provide a process for treating gaseous streams containing sulfur oxides to remove at least ninety percent of the sulfur oxides from the effluent gases and to produce a useful fertilizer component with no additional scrubber liquid treatment.

Since the use of fertilizer is seasonal, during certain times of the year, the fertilizer might not be saleable, and sufficient storage capacity may not be available. In such a case, the invention teaches how the ammonium salts can be converted to calcium sulfite in the form of a neutral sludge that is not hazardous to the environment as defined by the Environmental Protection Agency. The absorbent ammonium sulfite is substantially regenerated and recycled without the necessity of liberating ammonia as a gas, collecting and recycling it, in the manner described in U.S. Pat. Nos. 3,579,296 and 3,929,967.

The entire operation, with or without the production of calcium sulfite is controlled with simple instrumentation, and is capable of handling large changes of sulfur dioxide concentration with a minimum of attention.

Gases containing up to approximately 2% $SO_2$ and minor amounts of SO, after running through a suitable device to remove particulates, such as a fabric filter or precipitator, are run through two series of ducts, each with its own set of spray nozzles, entrainment separation and recirculation tank and pump. Each tank is provided with a pH meter, a specific gravity meter, a level controller, a temperature indicator and means for introduction of liquid or gaseous ammonia, which means are operated by the pH meter.

The pH in Stage 1 is maintained between 5.2 and 6.0 and in Stage 2 between 6.2 and 6.8. At this pH, the formation of an ammonia salt plume is virtually eliminated, as is the loss of ammonia. If the ammonia salt solution is the desired end product, recirculation in both stages is run with continuous pH adjustment is run until the specific gravity in the first stage reaches a desired level, usually between about 1.25 and about 1.3, at which point the sulfur content of the solution is over 12% and the nitrogen content is over 8%. This solution is then filtered to remove any particulates and can be used in the production of liquid fertilizers with no further preparation.

If there is no market for fertilizer, as during the late fall and early winter months, and the tank storage is full, the system is operated substantially as described except that a continuous stream of liquid is removed from the first stage, treated with an inexpensive metal oxide or hydroxide, such as calcium hydroxide or zinc oxide, until the pH is raised from about 6 to about 7.5 (since the reported pH of pure ammonium sulfite solution is 8.0, maintaining the system below this pH insures minimum free ammonia in the filter cake). The resultant calcium or zinc sulfite slurry is then pumped into a thickener, the clear overflow is returned to the second stage and the heavy underflow is filtered and washed. The solids are either hauled to a disposal site, particularly if calcium hydroxide is used, or stored for use in another process if zinc oxide is employed.

A typical reaction is:

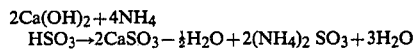

$2Ca(OH)_2 + 4NH_4HSO_3 \rightarrow 2CaSO_3 - \frac{1}{2}H_2O + 2(NH_4)_2 SO_3 + 3H_2O$ wherein no free ammonia is liberated.

According to the present invention, sulfur dioxide is removed from flue or stack gas by contacting a gas stream containing the sulfur dioxide in an absorber with an aqueous absorbent solution that is primarily ammonium sulfite-bisulfite. In substance, and in accordance with the invention, sulfur oxide containing effluent gases at elevated temperatures are initially contacted with ammonium sulfite-bisulfite solution in a scrubber having a series of spray nozzles along its length so as to permit effective contact with the rapidly moving gas stream. In both stages the following main reactions take place.

$$(NH_4)_2 SO_3 + SO_2 + H_2O \rightarrow 2(NH_4)HSO_3 \qquad 1.$$

$$NH_4 HSO_3 + NH_3 \rightarrow (NH_4)_2 SO_3 \qquad 2.$$

$$2(NH_4)_2 SO_3 + O_2 \rightarrow 2(NH_4)_2SO_4 \qquad 4.$$

In practicing the present invention, in effect, two multi-spray scrubbers are employed. The liquid from the first stage reaction flows into a reservoir wherein the liquor, containing mainly ammonium sulfite, bisulfite and sulfate is held while a portion of the liquor, after controlling the pH by reaction 2, is recycled to the spray nozzles. The recycling is continued until the concentration of ammonium salts is measured to be approximately 40% to 50%, an economical level permitting it to be removed from the first stage scrubber for use as a fertilizer or as a liquid fertilizer component.

Gases passing through the first stage scrubber then enter the second stage scrubber which includes a series of spray nozzles through which a more dilute ammonium sulfite, bisulfite solution is pumped. The second stage scrubber treats gas that has been stripped of the majority of the sulfur oxides in the gas.

When the liquid in the first stage reaches the desired concentration, some (±60%) it is removed and replaced by liquid from the second stage. A level in the second stage is maintained by adding water.

In order to reduce the plume to an acceptable level, means are provided so as to control the pH of the scrubber liquid in the second stage system to about 6.2 to 6.8.

The use of a series of sprays in each of the scrubbers is essential in the invention since minimum portions of the sulfur oxides are oxidized to the sulfate form. The plurality of sprays functions to also remove a substantial portion of any particles that may pass through the initial filter. Additionally, the arrangement of sprays in the scrubbers permits the treatment of high velocity gases, i.e. about twenty to fifty feet per second, and the treatment of uniform or non-uniform sulfur oxide containing gases by continuous treatment with ammonium sulfite along the length of the scrubber.

The invention will be more fully explained and exemplified in the following description and claims of a preferred embodiment, taken in conjunction with the accompanying drawings, wherein like reference characters refer to similar parts throughout the several views and in which:

DESCRIPTION OF THE PREFERRED EMBODIMENT OF THE INVENTION

Figure 1:
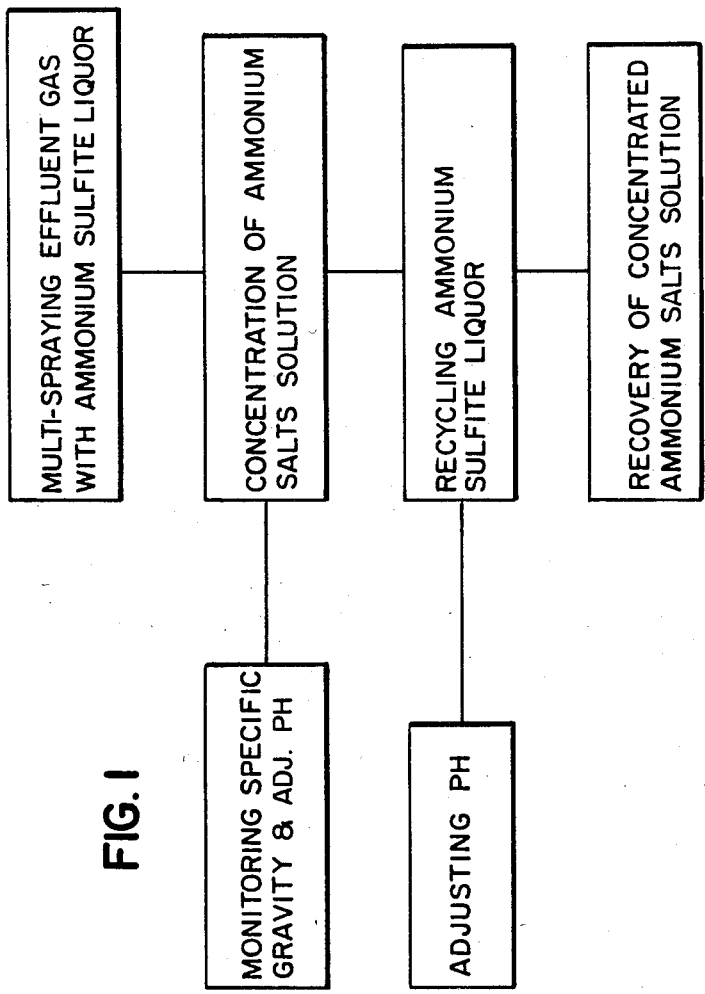
FIG. 1 is a schematic flow sheet.

Although specific terms are used in the following description for the sake of clarity, these terms are intended to refer only to the particular structure of the invention selected for illustration in the drawings and are not intended to define or limit the scope the invention.

Figure 2:
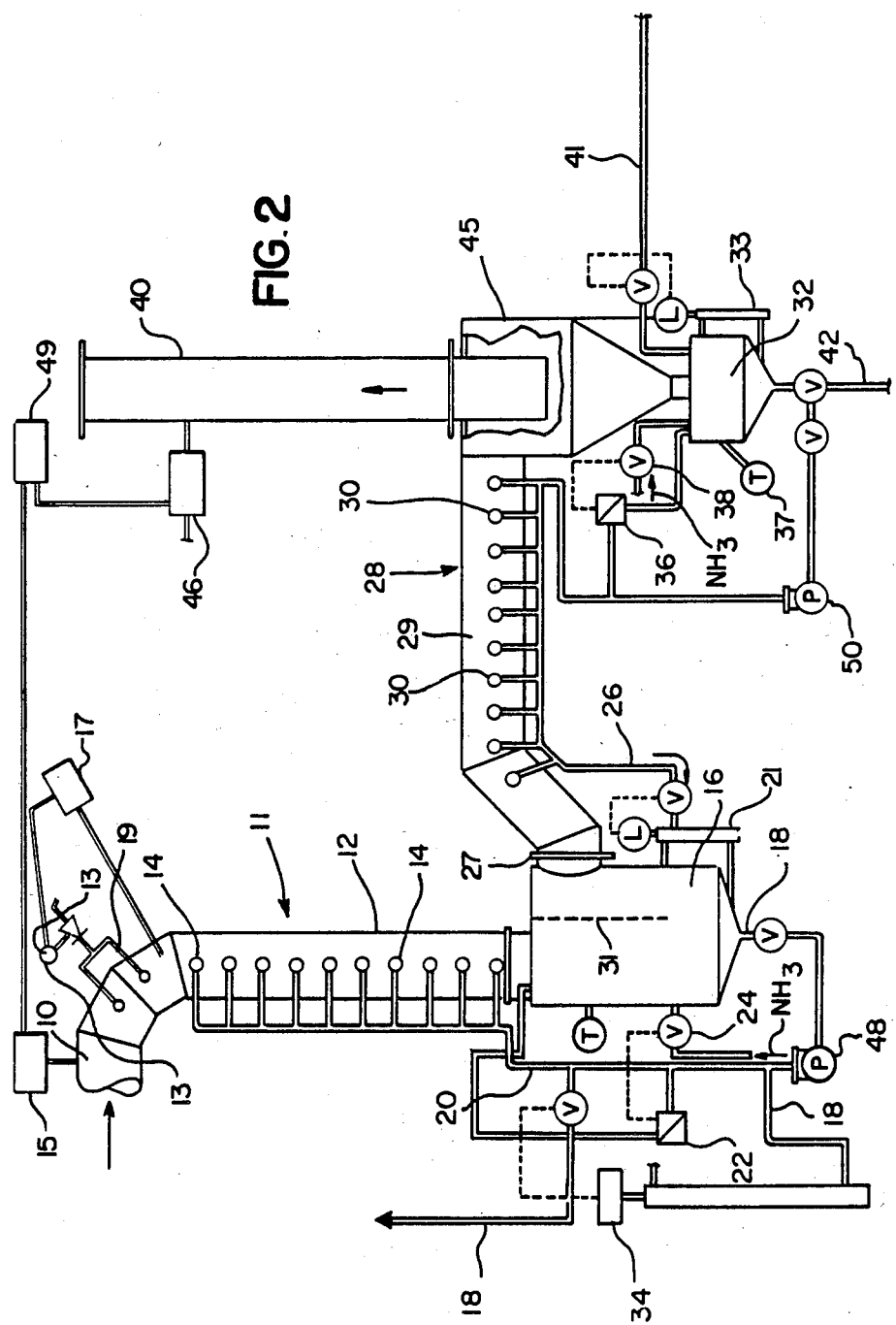
FIG. 2 is a schematic representation exemplifying one embodiment of the inventive system.

FIG. 1 is a schematic flow sheet of the process occurring in each stage of the system shown in FIG. 2. Generally, hot filtered flue or stack gases which have been filtered substantially free of particulates enter into the first stage scrubber 11. There are no temperature limitations, and if the entering gas is over 300 degrees Fahrenheit, the water sprays 19, which are positioned ahead of the scrubbing sprays 14 will be operated to cool the gases to 300 degrees Fahrenheit. The filtered gases are sprayed with ammonium sulfite liquor by means of a series of spray nozzles 14 which are positioned along the length of the scrubber. The gas velocities within the duct may range from 10 to 80 feet per second. The liquor containing the dissolved sulfite, bi-sulfite, and sulfate salts enters into a reservoir. In the reservoir, the pH is monitored and controlled to about 5 to 5.8 by the addition of ammonia, and a portion of the liquid is recycled back to the spray nozzles 14. The pH of the liquid is maintained by the pH controller 22 which controls the valve feeding ammonia into the vessel 16 as required. The specific gravity of the liquid is continuously monitored by the meter 34 and the temperature could be monitored by a pyrometer.

The recycling step takes place until the concentration of the dissolved salts in the liquor in the reservoir 16 reaches 40% to 50%, preferably 45%. It is at this concentration that the ammonium salts in the solution are considered to be of such concentration as to warrant removal. Liquor may be added into the system as required to maintain fluid level along with ammonia so as to regenerate the ammonium sulfite. The pH selected, 5 to 5.8 maintains ratios of bisulfite to sulfite of approximately 2.3 to 1 to 1 to 1. The higher ratios of bisulfite to sulfite are desirable to prevent crystallization upon cooling, since the bisulfite is much more soluble than the sulfite.

The treated gas enters from the first stage scrubber 11 into the second stage scrubber 28 wherein the same process which has just been described also takes place. However, the gas in the second stage contains only dilute amounts of sulfur oxides. The ammonium salts liquor is used to maintain the level in the first stage recirculation tank 16. The liquid level in the second stage reservoir 32 is maintained with water. A two stage scrubber system as illustrated is considered to be adequate for most treating operations, although, it should be noted that it is possible to add additional scrubbing stages if desired.

As illustrated in FIG. 2, the apparatus is shown with a gas entry pipe 10 wherein incoming flue or stack gases which have been passed through a known filtering apparatus (not shown) pass by a sulfur oxide concentration indicator 15 and into the first stage scrubber 11. The first stage scrubber 11 comprises a scrubbing column 12, which scrubbing column is equipped with a temperature indicator and temperature controller 13, 17 associated with an initial spray nozzle or nozzles 19. The nozzle 19 is controlled in known manner to spray sufficient quantitites of water so as to lower the incoming gas temperature to about 300 degrees Fahrenheit, if necessary. There is also provided in the scrubbing column 12 a series of spray nozzles 14 through which an ammonium sulfite-bisulfite solution at a pH of 5 to 5.8 is sprayed onto the incoming gas by employing a system pump 48 of conventional design for the purpose in known manner. The ammonium sulfite solution immediately reacts with the sulfur oxides of the flue gas and the liquids flow downwardly by gravity into the reservoir 16.

At the bottom of the reservoir 16 is positioned a valved removal line 18 from which an ammonium salts rich liquor can be removed for subsequent resale or recirculation. A recycle line 20 extends from the pump 48 and transfers from the reservoir 16 a portion of the liquid for recycling to the scrubbing column 12 through the spray nozzles 14. A pH indicator and controller 22 is provided in cooperation with a source for ammonia and a valve 24 so as to maintain the pH in the system in the desired range. The ammonium sulfite, bi-sulfite solution generated may be continuously recycled until the concentration has reached the desired level (40% to 50%), at which time, the ammonium salt rich liquid can be removed. To maintain the desired liquid level, a controller 21 is provided, which allows liquid from the second stage reservoir 32 to be transferred to the first stage reservoir 16 through the recirculating line 26.

Gases flowing through the first stage duct 12 to the vessel or reservoir 16 discharge their entrained solution droplets into the bottom of the reservoir 16 by gravity and flow about a baffle 31 into the second stage duct system or scrubbing column 29 through a connector 27 where another series of spray nozzles 30 are positioned. The liquid from the second stage reservoir 32 is sprayed into the gas stream and through the spray nozzles 30 and is collected by means of a cyclone separator 45. The cyclone separator 45 functions to return the liquid to the second stage reservoir 32 from which the second stage pump 50 can again pump it back to the spray nozzles 30. This liquid is a more dilute solution of ammonium sulfite-bisulfite having a specific gravity between about 1 and about 1.2. The pH is maintained at a point between about 6.2 and 6.8 by the pH meter 36 which is provided to feed ammonia through the control valve 38. By recirculating the liquid at a rate that provides much more ammonium sulfite than the stoichiometric ratio, high scrubbing efficiency is maintained over wide ranges of $SO_2$ concentrations.

The liquid level in the second stage reservoir 32 is maintained by a conventional level controller 33, which functions to open a valve in the feed water line 41 until the desired liquid level is reached. The specific gravity and temperature of the liquid are continuously monitored by suitable instruments, including a conventional pyrometer 37. The gases, which are now separated from the liquid drops, have the sulfur oxide content reduced by at least ninety percent are discharged to atmosphere through the stack 40. The sulfur oxide content of the cleaned gas stream can be continuously monitored at the exit stack 40 by employing a suitable SO meter 46 and recorder 49.

When the liquid in the first stage reservoir 16 has reached the desired specific gravity, the liquid is withdrawn, filtered and directed into a storage tank (not shown). Additionally, when the level in the reservoir 16 has reached the halfway point, the level controller 21 functions in known manner to open a valve in line 26, allowing the reservoir 16 to fill up with liquid from the second stage reservoir 32. This is done at a rate slow enough not to seriously reduce line pressure in the recirculating line 26 to thereby not reduce the efficiency of the spray nozzles 30. The liquid level in the second stage reservoir or tank 32 is controlled by the level controller 33 which functions to open a water valve in the feed water line 41 to bring the reservoir up to its desired liquid level.

Gases leaving the first stage scrubber 11 are then directed to pass through the top of the first stage reservoir 16 into the second stage scrubber 28 which comprises a scrubbing duct 29. The gases enter the scrubbing duct 29 and are contacted with sprays of ammonium sulfite solution from the plurality of spray nozzles 30. The scrubbing solution then enters the second reservoir 32 wherein a portion of the solution is recycled to the spray nozzles 30 for continuous treatment of the incoming gases in the second stage scrubber 28. The pH of the liquid in reservoir 32 is constantly monitored by a pH indicator and controller 36 at the desired level.

The liquid flows in each pump discharge line 20, 26 are sensed by suitable instruments in known manner, which instruments send electronic or other signals to suitable recorder-controllers (not shown). Although the second stage scrubber 28 is shown to be horizontally disposed in the described embodiment, a vertical scrubber may be used instead without affecting the operation of the system.

In the first illustrated embodiment, two stages of treatment with the ammoniacal liquid are indicated, but it will be understood that the operation need not be limited to this number. The SO containing gas in the first stage of absorption contacts ammonium sulfite, and continues its descent through the succeeding stages of SO absorption to discharge. In each successive stage of treatment, the pH of the liquid is maintained and adjudged independently. The cyclone separator 45 has been found to be advantageous for removal of liquid.

Thus, it is apparent that there has been provided, according to the invention, an outstanding, simple system for treating flue or stack gases containing sulfur oxides for the efficient removal of these contaminants and for the generation of ammonium salts solution which can be utilized for industrial or agricultural purposes.

Figure 3:
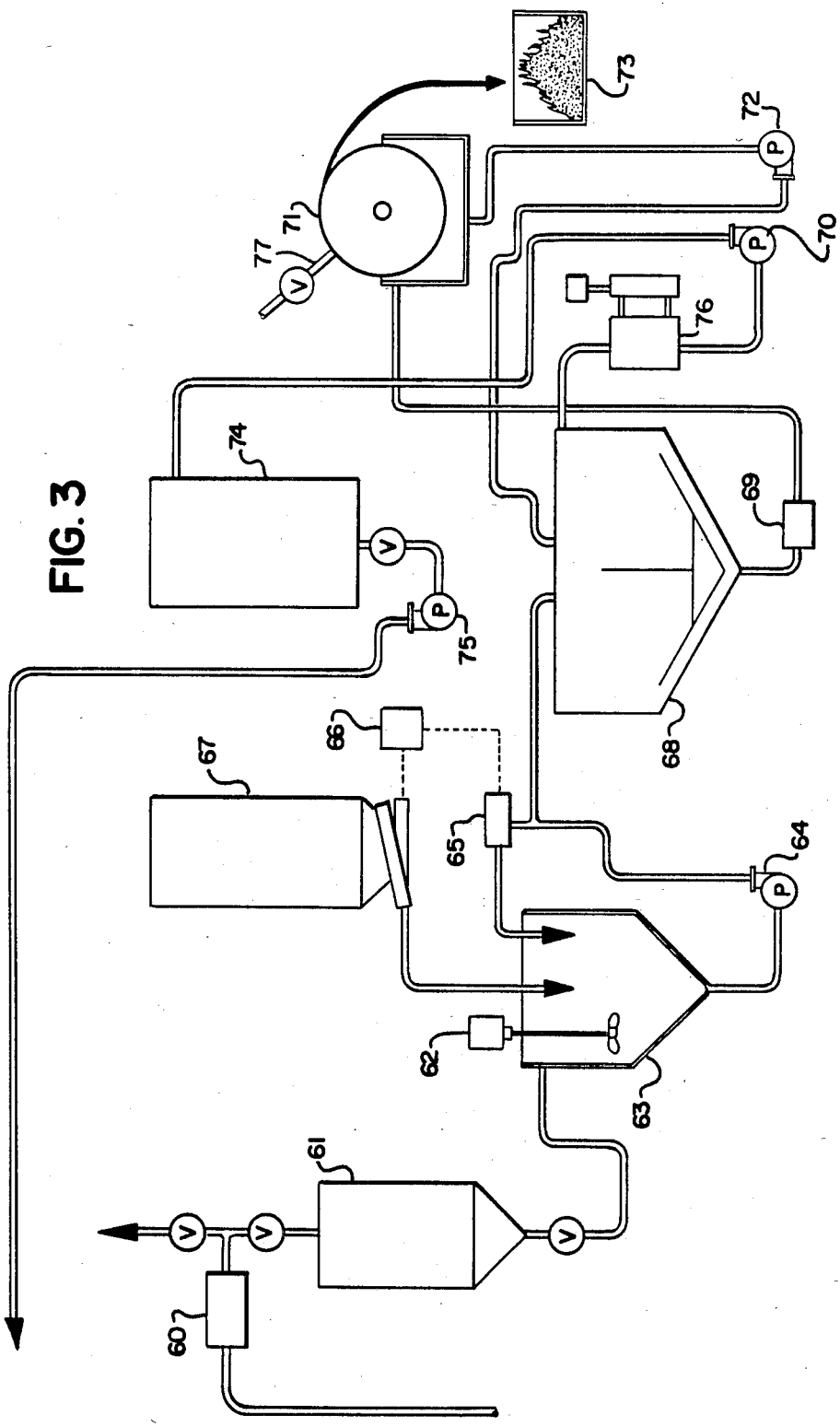
FIG. 3 is a schematic representation exemplifying a further embodiment of the invention.

In accordance with a further feature of the present invention, if the desired end product is a calcium or zinc sulfite salt, a continuous stream of solution from the first stage reservoir 16 is passed through a conventional filter 60 as illustrated in FIG. 3, and enters a surge tank 61. The liquid from the tank 61 is then passed into a pH adjustment container 63 where a pH controller 65 operates a lime feeder 66 and storage bin 67 to control the pH to the desired range, typically at approximately 6.8. A mixer 62 may be provided in the container 63 to insure a complete reaction in a known manner. By maintaining the pH within the desired range, substantially no free ammonia will be liberated and the filter cake will be odorless. Accordingly, there will be a resultant savings of energy since it is not necessary to remove free ammonia or to provide protective means for personnel which may be handling and ultimately disposing of the product.

The liquid from the pH adjustment container 63 along with the suspended metal sulfites are continuously pumped into a thickening means 68 wherein the solids will settle to the bottom and can be removed by means of slurry pump 69, or the like, as a slurry containing approximately twenty percent to thirty percent solids. The slurry is then passed to a filter means 71, such as rotary vacuum filter. A clear overflow liquid from the settler or thickening means 68, as controlled by a level controller 76 goes to the regenerated ammonium sulfite solution storage tank 74 through operation of the liquor controller pump 70. The filter cake from the filter can be conveyed into a disposal conveying means 73 such as a truck in known manner. Liquid from the filter 71 is pumped by means of a pump 72 back into the thickening means 68 for further clarification. Wash water 77 that is equal approximately in amount to the dry metal sulfite cake weight may be used to wash the filter cake so as to minimize loss of ammonia salts. The wash liquid is then combined with the filtrate for use in the system.

The thickening means 68 is preferably provided with a liquor sump level controller pump 70 which removes the clean (or clear) liquid and passes it to a regenerated ammonium sulfite storage tank 74. The liquid in the storage tank 74 contains ammonium sulfite solution which is returned by a suitable pump 75 to the first stage scrubber reservoir 16 at approximately the same volumetric rate as that at which the liquor is removed. Any pH adjustment which may be required in the first stage reservoir 16 is accomplished by adding ammonia as required by the pH meter 22, or if too high, by temporarily stopping the return of the regenerated liquor.

Although the invention has been described with reference to the particular embodiments herein set forth, it is understood that the present disclosure has been made only by way of example and that numerous changes in the details of construction and the combination and arrangement of parts may be resorted to without departing from the spirit and scope of the invention. Thus, the scope of the invention should not be limited to the foregoing specification but rather by the scope of the claims amended hereto.

What is claimed is:

1. A process for removal of sulfur oxides from sulfur oxide containing flue gases comprising
    scrubbing the flue gases in the first stage scrubber with an ammomium sulfite solution to remove most of the sulfur oxides and producing a liquor comprising ammonium sulfite, bisulfite and sulfate salts;
    recycling the liquor in the first stage scrubber and producing a 40% to 50% solution of dissolved ammonium sulfite, bisulfite and sulfate salts in a first stage reservoir while maintaining the pH between about 5 and 5.8;
    maintaining the ratio of bisulfite to sulfite between approximately 2.3 to 1 and 1 to 1 without liberating ammonia;
    removing portions of the 40% to 50% solution of dissolved salts from the first stage reservoir;
    scrubbing the flue gases in a second stage scrubber with an ammonium sulfite solution of pH between 6.2 and 6.8 to remove additional sulfur oxides and producing a dilute liquor of 1% to 10% solids comprising ammonium sulfite, bisulfite and sulfate salts in a second stage reservoir; and
    pumping the dilute liquor from the second stage reservoir to the first stage reservoir in amounts sufficient to replace the said removed portions.

2. The process of claim 1 wherein the maintaining the pH is accomplished by adding a pH maintaining agent selected from the class comprising ammonia and ammonium sulfite solution.

3. The process of claim 2 further comprising treating the removal portions of the solution with zinc oxide to remove sufficient sulfur dioxide to regenerate the ammonium sulfite by producing an insoluble metal sulfite at pH between approximately 6.5 and 7.0.

4. The process of claim 2 further comprising treating the removal portions of the solution with calcium hydroxide and recovering the ammonia for reuse.

5. The process of claim 3 and raising the pH to a value of about 6.5 to 7.

6. The process of claim 4 and raising the pH to a value of about 6.5 to 7.

7. The process of claim 3 wherein the treating with zinc oxide is carried on without the release of free ammonia.

8. The process of claim 4 wherein the treating with calcium hydroxide is carried on without the release of free ammonia.

* * * * *